United States Patent [19]
Chaconas et al.

[11] Patent Number: 4,968,193
[45] Date of Patent: Nov. 6, 1990

[54] SELF-CENTERING DRILL BIT WITH PILOT TIP

[75] Inventors: Peter C. Chaconas, Glyndon; Paul A. Stone, Silver Run, both of Md.

[73] Assignee: Black & Decker Corporation, Newark, Del.

[21] Appl. No.: 897,716

[22] Filed: Aug. 18, 1986

[51] Int. Cl.⁵ .............................................. B23B 51/02
[52] U.S. Cl. .................................. 408/211; 408/225; 408/230
[58] Field of Search ............... 408/204, 206, 211, 214, 408/223, 224, 225, 227, 230

[56] References Cited

U.S. PATENT DOCUMENTS

| | | | |
|---|---|---|---|
| 546,041 | 9/1895 | Tyberg | 408/230 |
| 2,193,186 | 3/1940 | Bannister | 408/225 |
| 2,332,295 | 10/1943 | Bouchal | 408/225 |
| 2,600,286 | 6/1952 | Weiland | 408/225 |
| 2,652,083 | 9/1953 | Emmons | 408/211 |
| 2,778,252 | 1/1957 | Oxford, Jr. | 408/230 |
| 2,866,302 | 12/1958 | Amiet | 51/219 |
| 2,903,922 | 9/1959 | Ernst et al. | 408/230 |
| 3,237,488 | 3/1966 | Parone et al. | |
| 3,592,555 | 7/1971 | Mackey, Sr. | 408/225 |
| 3,779,664 | 12/1973 | Caley et al. | 408/225 |
| 3,920,350 | 2/1974 | Southall | 408/211 |
| 4,080,093 | 3/1978 | Maier | 408/230 |
| 4,209,275 | 6/1980 | Kim | 408/211 |
| 4,330,229 | 5/1982 | Croydon | 408/212 |
| 4,556,347 | 12/1985 | Barish | 408/230 |
| 4,565,473 | 1/1986 | Hosoi | 408/224 |
| 4,605,347 | 8/1986 | Jodock et al. | 408/225 |

FOREIGN PATENT DOCUMENTS

| | | | |
|---|---|---|---|
| 1097104 | 3/1981 | Canada | 408/225 |
| 0088037 | 9/1983 | European Pat. Off. | |
| 0137898 | 4/1985 | European Pat. Off. | |
| 3123048 | 8/1982 | Fed. Rep. of Germany | |
| 3316193 | 11/1984 | Fed. Rep. of Germany | |
| 2540424 | 8/1984 | France | |
| 60979 | 2/1924 | Sweden | 408/223 |
| 299798 | 9/1954 | Switzerland | 408/224 |
| 1238905 | 6/1986 | U.S.S.R. | 408/230 |
| 653193 | 5/1951 | United Kingdom | |
| 890807 | 3/1962 | United Kingdom | |
| 937767 | 9/1963 | United Kingdom | |
| 1368270 | 9/1974 | United Kingdom | |
| 1425256 | 2/1976 | United Kingdom | |
| 2074059 | 10/1981 | United Kingdom | |

OTHER PUBLICATIONS

Tool and Manufacturing Engineers Handbook, vol. 1, Machining, fourth edition, 1983, pp. 9–42.
Werkstattstechnik, vol. 64, No. 6, 1974, "Spezial-Wendelbohrer", p. 373.

*Primary Examiner*—Daniel W. Howell
*Attorney, Agent, or Firm*—J. Bruce Hoofnagle

[57] ABSTRACT

A self-centering twist drill bit 20 is formed with a "fishtail" cutting section 32 having major cutting lips 72 and 74 on a working end 26 thereof at a point angle of 190°. Tip relief surfaces 76 and 78 trail cutting lips 72 and 74. A pilot tip 38 on the working end 26 extends axially from the "fishtail" cutting section 32 and is formed with a split point having leading cutting edges 40 and 42 and minor cutting lips 46 and 48. Outer surfaces 58 and 60 of pilot tip 38 are each formed with a radial relief and a back taper and joins with cutting section 32 along fillets 92 and 100 which are also radially relieved.

26 Claims, 2 Drawing Sheets

SELF-CENTERING DRILL BIT WITH PILOT TIP

BACKGROUND OF THE INVENTION

This invention relates to a self-centering drill bit with a pilot tip and particularly relates to a twist drill formed with a pilot tip extending axially from a larger "fishtail" drill section having a substantially larger diameter than the pilot tip.

One of the most commonly used twist drills is formed with a chisel edge, or chisel point, at the work-engaging end of the drill. An example of a chisel edge drill is illustrated in U.S. Pat. No. 3,237,488 which issued to A. D. Parone et al. The chisel edge is formed normal to the axis of the drill and usually extends equally on opposite sides of the drill axis. While the chisel edge is the first portion of the drill to engage the workpiece, the cutting lips typically taper rearwardly and from the opposite ends of the chisel edge. In use, the chisel edge engages the workpiece and literally works the material in the immediate vicinity into an extrudate rather than forming chips for extraction. The worked material permits the drill to begin to move into the material of the workpiece whereby the cutting lips begin to cut the material and form removable chips.

While the chisel-edge twist drill is satisfactory for some drilling operations, it does not provide holes with accurately located centers or round holes. For example, the chisel edge drill, which includes two flutes and two cutting lips, tends to "skip" away from the desired hole location as the rotating chisel edge engages the workpiece. Further, any out-of-round characteristic of the drill or the chuck supporting the drill is transmitted to the working end during a hole-drilling operation. This results in the formation of an oversize hole. In addition, twist drills having a chisel edge typically have a relatively large web which is slightly less than the length of the chisel edge. Drills with larger webs require significant thrust in order to urge the drill into the workpiece. The larger webs also limit the effective space for chip removal through the flutes, the radial depth of which is determined by the web thickness.

In order to overcome some of the deficiencies encountered in the use of the chisel-edge twist drill, a variety of modified, special purpose tips have been developed in the past. For example, a split point tip was developed as a variation of the conventional chisel edge. One example of a split point drill is illustrated in U.S. Pat. No. 4,556,347 which issued to H. B. Barish. To form a split point, the faces of the drill tip which extend away from the conventional chisel edge are ground to form cutting lips coincidental with the location of the chisel edge and on opposite sides of the center of the chisel edge. This results in eliminating or reducing significantly the length of the chisel edge. It also provides additional cutting lips at the tip and effectively reduces the web thickness. By reducing the chisel length, less thrust is required. Also, by providing cutting lips near the tip of the drill and eliminating or reducing significantly the length of the chisel edge, chip formation occurs earlier in the drilling operation at the tip end to thereby more efficiently remove the material initially encountered by the tip. This action also assists in reducing the thrust required to urge the drill into the workpiece.

Due to the forward location of the cutting lips on a split point drill, material from the workpiece is removed promptly thereby allowing the forward end of the drill to seat firmly in the workpiece. This stabilizes the drill with the workpiece. In addition, due to the reduced length of the chisel edge, which approaches a point, any skipping action which may occur with chisel edge drill is avoided by a split-point drill and thereby provides a self-centering action.

Other types of drills or hole-forming bits are available which have a self-centering capability. These drills or bits have a variety of center-point tips which provide some degree of drill bit centering followed by the actual hole cutting facility. Some examples of these are spade bits, solid-center auger bits, power bore bits and brad-point bits. Typically, the tips of these bits are formed with cone or spike shaped tips, some of which are threaded. One such drill is illustrated in U.S. Pat. No. 2,332,295, which issued to J. J. Bouchal, wherein a mutifaceted tip terminates in a point at the forward end of the drill. This drill is particularly suited for drilling holes in wood. Another example is illustrated in U.S. Pat. No. 3,779,664, which issued to L. E. Caley et al. In this teaching, the drill is formed with a center tip in the shape of an inverted cone and is used to drill holes in non-ferrous metals and other low-yield strength materials.

In some of these hole-generating drills or tools, the cutting portions of the drill extend generally laterally, or only slightly angularly, from the center point. An example of drills of this type are illustrated in U.S. Pat. No. 2,600,286, which issued to C. H. Weiland, and U.S. Pat. No. 4,209,275 which issued to J. B. Kim. In use of such drills, the center point of the rotating drill enters the workpiece to establish the center of the hole to be drilled. Thereafter, the forwardly turned edges of the drill engages and scribe a circular cut in the workpiece which defines the size, or diameter, of the hole to be formed. As the drill continues to move into the workpiece, cutting lips between the center point and the turned edges cut away the intervening material which forms chips for removal through the flutes. Eventually, as the center point and the turned edges exit the other side of the workpiece, a disc-like section of workpiece material results between the center point and the turned edge in the completion of the forming of the hole. A cutting operation which results in the formation of the disc-like section, upon completion of the hole formation, is referred to as trepanning and drills or tools used in such operations are referred to as trepanners.

Other types of drills, referred to as step drills, are formed with several sections or lengths in the axial direction. The forward section is formed with the smallest diameter, the last or trailing section is formed with the largest diameter and the intermediate section or sections are formed with intermediate diameters to form a stepped configuration. Step drills are typically used to form a variety of hole shapes such as countersink, counterbores, and so on.

Still another type of drill includes a pilot tip of small diameter which is similar to a step drill but with an exceptionally short tip. An example of this type of drill is illustrated in U.S. Pat. No. 3,592,555 which issued to B. A. Mackey, Sr. This drill is formed with relatively long cutting lips which include rounded portions. This requires significant increase in the thrust and torque requirements in the formation of a hole. While this drill shows a cutting point for stabilizing the drill upon penetration of soft as well as hard materials, the point is relatively flat and appears to be fragile. Also, the cutting point employs a chisel edge with its attendant disadvantages.

As disclosed in U.S. Pat. No. 4,565,473, which issued to Toshiaki Hosoi, a deep-hole drill is formed with a shank body and two separate tips which form the cutting portions of the drill. Each tip is brazed to the shank body and forms a straight cutting edge which extends inwardly of the drill from the periphery thereof. Each tip is further formed with a cured cutting edge which extends generally from the inward end of the straight cutting edge and terminates at the axial center of the drill. The tips are mounted independently on the shank body and are not provided with any backing support, for example by the shank body, in the area of the curved cutting edge. In addition, the drill is illustrated with straight flutes, although helical flutes could be formed as noted in the patent. Further, the illustrated embodiments include flute structure which has a flute width ratio of 0.5 to 0.02.

In one embodiment of the drill illustrated in U.S. Pat. No. 4,565,473, the tips are arranged in two diagonal quadrants, as viewed from the tip end of the drill, so that the straight cutting edges present a "fishtail" profile, as viewed from the side, with a two-piece pilot tip extending axially therefrom. In this arrangement, the rake faces of each of the tips overhand into the flute area of the drill and, thereby, do not present a continuous flute surface extending to the tip of the working end of the drill. This overhang would appear to disrupt the smooth flow of chips from the working end of the drill into the flutes of the body. In addition, the tips are not formed integrally with the body of the drill but are brazed in place and thereby lack the inherent support attained with an integral structure. Further, the tips are generally flat in cross section and are located only in two diagonal quadrants of the tip end of the drill. In this arrangement, the tips do not obtain the type of backing support obtainable by an integrally formed, generally cylindrical pilot tip which includes tip portions located in all four quadrants of the tip end. This is particularly significant because the pilot tip portions of the tips illustrated in U.S. Pat. No. 4,565,473 extend axially beyond the end of the shank body and, consequently, have only the backing support provided by that portion of each tip.

While each of the drill bits described above possesses some merits in the drilling art, there is a need for a single drill bit which possesses many attributes such as a drill bit which is self centering, requires relatively low thrust, does not jam or form burrs at breakthrough, will not develop transient loading or wobble and thereby avoid breaking of corners, does not stall while drilling, will penetrate the workpiece with ease, is less susceptible to breakage, will produce a thicker chip for heat dissipation from the cutting edge and powderless full waste removal, will generate a self feeding capability to enhance the lower thrust characteristic, will develop a burr-free accurately-formed round hole and will provide comparatively longer drill life.

SUMMARY OF THE INVENTION

In accordance with the teachings of the present invention, a self-centering drill bit includes an elongated drill body having a shank end and a working end. Flutes are formed in the drill body and extend to a free end tip at the working end. The working end of the drill body is formed with a first section of a prescribed major diameter and includes major cutting lips arranged in a "fishtail" or inversely angled configuration for cutting a primary hole in a workpiece. A second section is formed on the working end of the drill body and extends from the first section in a direction away from the shank end of the drill body. The second section is formed with a minor drill diameter which is smaller than the prescribed major diameter. The second section of the drill body is formed with minor cutting lips for cutting a secondary hole in the workpiece preceding the cutting of the primary hole.

Other features and advantages of the present invention will become more fully apparent from the following detailed description of the preferred embodiment, the appended claims and the accompanying drawings.

DETAILED DESCRIPTION OF THE INVENTION

The preferred embodiment of the present invention is illustrated by was of example in FIGS. 1 through 9.

Figure 1:
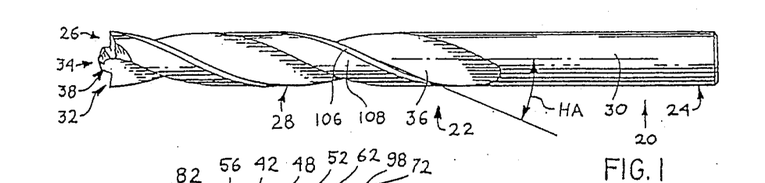
FIG. 1 is a side view showing a drill bit embodying certain principles of the invention.

As illustrated in FIG. 1, a stepped drill bit 20 for cutting a variety of materials such as metal, wood, plastics, laminates, piping and tubing is formed with an elongated drill body 22 having an elongated axis and which is composed of high speed steel. Drill body 22 is formed with a shank end 24, a working end 26 and a fluted section 28 interposed between the shank end and the working end. Shank end 24 includes a round shank 30 which extends from the end of drill body 22 to one end of fluted section 28. Working end 26 includes a "fishtail" or inversely angled cutting section 32 of a major diameter and a pilot tip cutting section 34 of a minor diameter which is smaller than the major diameter. Fluted section 28 is formed with a pair of helical flutes 36 formed at a prescribed helix angle and which begin at the inward end of shank 30 and extend to the outward end of working end 26.

Figures 2, 3, 4, 5:
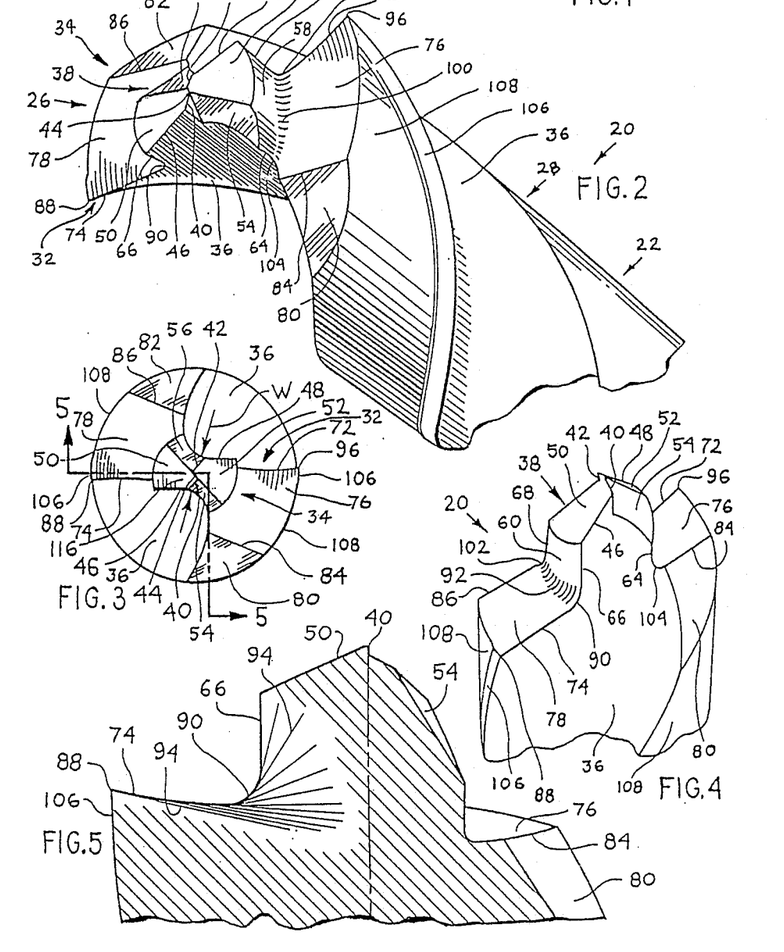
FIG. 2 is a perspective view of a working end of the drill bit of FIG. 1 showing various surfaces and edges of the drill bit embodying certain principles of the invention.
FIG. 3 is an end view of the working end of the drill bit of FIG. 2 showing a general arrangement of the surfaces and edges of the working end.
FIG. 4 is a perspective view of the working end of the drill bit of FIG. 2 showing additional surfaces and edges of the working end embodying certain principles of the invention.
FIG. 5 is a section view taken along line 5—5 of FIG. 3 and along a major cutting lip at the working end of the drill bit showing particularly the contour of portions of the cutting lip and certain other edges of the working end.

Referring to FIGS. 2 and 3, pilot tip cutting section 34 of drill body 22 is formed with a pilot tip 38 which is formed integrally with and extends a short distance axially beyond "fishtail" section 32. Further, pilot tip 38 is formed at its tip end with a conventional split point having spaced cutting edges 40 and 42 with a slight chisel edge 44 extending therebetween.

Minor cutting lips 46 and 48 are formed on pilot tip 38 with lip relief surfaces 50 and 52 formed behind cutting edges 40 and 42, respectively, and behind cutting lips 46 and 48, respectively, to provide necessary clearance. Steep surfaces 54 and 56 are formed forward of cutting edges 40 and 42, respectively, to provide for the formation of the cutting edges. Pilot tip 38 is formed with rounded outer surfaces 58 (FIG. 2) and 60 (FIG. 4) in an axial direction on opposite sides of the pilot tip. As viewed in FIG. 2, outer surface 58 is formed with a forward edge 62 and a trailing edge 64. As illustrated in FIG. 4, outer surface 60 is formed with a forward edge 66 and a trailing edge 68.

Referring to FIGS. 2 and 4, outer surfaces 58 and 60 are generally rounded but are curved radially inwardly as the outer surfaces extend from forward edges 62 and 66 to trailing edges 64 and 68, respectively. This is more clearly illustrated in FIG. 9 where outer surfaces 58 and 60 are depicted as curving radially inwardly of a true circle represented by dashed line 70 as represented by radial relief "RR." In this manner, radial relief surfaces for forward edges 62 and 66 are formed by outer surfaces 58 and 60, respectively.

Figure 8:
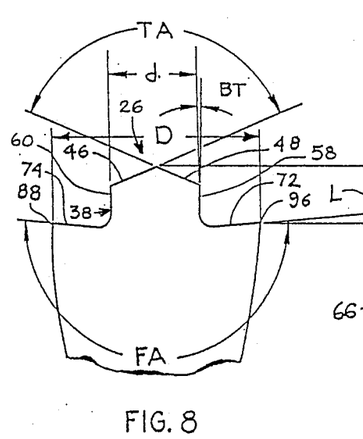
FIG. 8 is a partial side view of the drill bit similar to FIG. 7 which illustrates a variety of significant parameters of the working end of the drill bit in accordance with certain principles of the invention.

FIG. 8 is an outline of the profile of working end 26 and illustrates various parameters of drill bit 20. As viewed in FIG. 8, each of the outer surfaces 58 and 60 are relieved in the axial direction by the formation of a tapered slope, or radially inward pilot back taper "BT", from the tip end of working end 26 to the base of pilot tip 38.

Referring to FIG. 2, "fishtail" cutting section 32 is formed with a pair of major cutting lips 72 and 74 and with lip relief surfaces 76 and 78, respectively, to form the cutting section with a "fishtail" configuration (FIG. 7) of the type typically used for drilling holes in thin sheet metal. Steep relief surfaces 80 and 82 are also formed on "fishtail" cutting section 32 during the period when steep forward surfaces 54 and 56 are being formed on pilot tip 38. Formation of lip relief surfaces 76 and 78 result in the formation of trailing edges 84 and 86, respectively.

During formation of various relief surfaces, each of the major cutting lips 72 and 74 is formed with a section which slopes in the direction of working end 26 as the lip approaches pilot tip 38. For example, as more clearly shown in FIG. 4, cutting lip 74 begins at an outer point 88 and progresses toward pilot tip 38. Between outer point 88 and pilot tip 38, lip 74 begins to curve toward the working end 26 to eventually form a large radius at a forward edge 90 of a fillet 92 where the lip merges with forward edge 66 of outer surface 60 of the tip. This can be readily viewed in FIG. 5 where tangent lines 94 illustrate the upwardly curving cutting lip 74 and forward edge 66. Note that a portion of the cross-hatching in FIG. 5 has been removed to clearly reveal tangent lines 94 and the manner in which cutting lip 74 curves upwardly.

Referring to FIG. 2, cutting lip 72 extends from an outer point 96 and eventually curves in an identical manner into a large radius at a forward edge 98 of a fillet 100 where the lip merges with forward edge 62 of outer surface 58 of pilot tip 38.

Referring to FIGS. 2 and 4, each of the fillets 92 and 100 begin at forward edges 90 and 98, respectively, with the large radius such as the radius illustrated in FIG. 5. As the fillets 92 and 100 rake rearwardly from forward edges 90 and 98, respectively, the radius becomes progressively smaller until the fillets terminate in nearly-squared trailing corners 102 and 104, respectively. In addition, each of the fillets 92 and 100, rake radially inwardly from forward edges 90 and 98 to trailing corners 102 and 104, respectively, in the same manner as the outer surfaces 58 and 60, respectively. In this manner, fillets 92 and 100 are radially relieved with respect to the axis of drill body 22 to provide relief for forward edges 90 and 98, respectively.

Thus, continuous trailing relief is provided behind all forward work-engaging edges. For example, all surfaces of drill body 22 which trail major cutting lip 74, fillet forward edge 90 and pilot tip forward edge 66, are relieved in the manner described above so that, when drill bit 20 is used to drill a hole in a workpiece, these trailing surfaces do not engage and rub against the walls of the hole. Similarly, all surfaces which trail cutting lip 72, fillet forward edge 98 and pilot tip forward edge 62 are relieved as described so that, when drill bit 20 is used to drill a hole in a workpiece, these trailing surfaces do not engage and rub against the walls of the hole.

Referring to FIGS. 1 and 2, drill body 22 is formed with margins 106 in a conventional manner on lands 108 of the drill body where the lands are contiguous with the forward edge of flute 36.

Figures 6, 7:
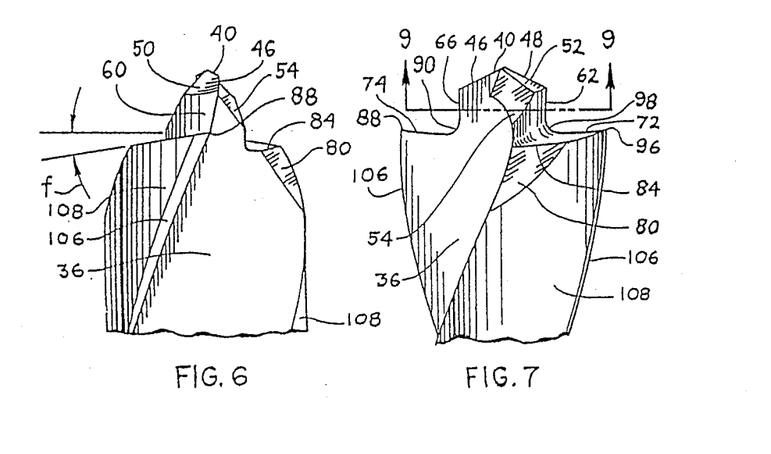
FIG. 6 is a partial side view of the drill bit showing the working end in particular alignment.
FIG. 7 is a partial side view of the drill bit showing the working end in an alignment which is rotated ninety degrees from the alignment shown in FIG. 6.
Figure 9:
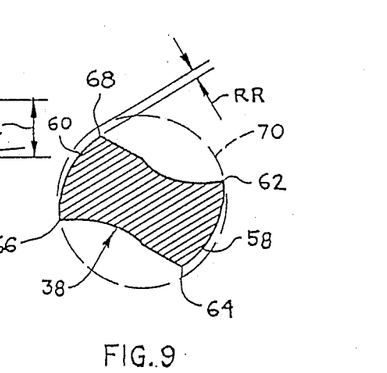
FIG. 9 is a section view taken along line 9—9 of FIG. 7 showing radial relief of a pilot tip of the working end in accordance with certain principles of the invention.

Referring to FIGS. 6, 8 and 9, working end 26 is formed as illustrated with the various surfaces and cutting elements being dimensionally configured to produce the enhanced drill bit 20 for superior performance in the formation of a hole in a workpiece. The parameters of the illustrated portions of drill bit 20 combine to provide for efficient cutting ability of the drill bit with superior relief from the cutting action to preclude any rubbing of the walls of the hole.

Referring to FIG. 8, pilot tip 38 is formed with a point angle "TA" which, in the preferred embodiment, is 135 degrees. The diameter "d" of pilot tip 38 is thirty-seven percent of the major diameter "D" of the drill body 22 while the height or length "L" of the pilot tip is seventy percent of the pilot tip diameter "d." For example, referring to the table of parameters below, a ¼ inch drill bit will be formed with a pilot tip diameter of 0.185 inch and and a pilot tip length of 0.129 inch. Because of the small major diameters of the ⅛ inch to 3/16 inch drill bits, the pilot tip diameter "d" and pilot tip length "L" of these drill bits are based on larger percentage factors than the remaining drill bit sizes in the table.

| TABLE OF PARAMETERS OF DRILL BIT 20 | | | | | | | | | | |
|---|---|---|---|---|---|---|---|---|---|---|
| Size (nom) | dio D | length | flute length | relief dio | web point | Margin | Land | d | L | f |
| 1/8 | .125 | 2.75 | 1.62 | .115 | .02 | .015 | .07 | .063 | .05 | 14' |
| 9/64 | .1406 | 2.88 | 1.75 | .13 | .022 | .016 | .08 | ↑ | ↑ | 12' |
| 5/32 | .1562 | 3.12 | 2 | .146 | .024 | .017 | .09 | ↑ | ↑ | ↑ |
| 11/64 | .1719 | 3.25 | 2.12 | .16 | .026 | .018 | .1 | ↓ | ↓ | ↑ |
| 3/16 | .1875 | 3.5 | 2.31 | .176 | .028 | .018 | .11 | .069 | .05 | ↑ |
| 13/64 | .2031 | 3.62 | 2.44 | .191 | .03 | .019 | .12 | .075 | .052 | ↑ |
| 7/32 | .2188 | 3.87 | 2.5 | .207 | .032 | .019 | .125 | .08 | .056 | ↑ |
| 15/64 | .2344 | 4 | 2.62 | .222 | .034 | .02 | .13 | .087 | .061 | ↑ |
| 1/4 | .25 | 4.12 | 2.75 | .238 | .035 | .02 | .135 | .092 | .064 | ↑ |
| 17/64 | .2656 | 4.25 | 2.88 | .253 | .038 | .021 | .14 | .098 | .068 | ↑ |
| 9/32 | .2812 | 4.37 | 2.94 | .269 | .041 | .021 | .15 | .104 | .073 | ↑ |
| 19/64 | .2969 | 4.5 | 3.06 | .284 | .044 | .022 | .16 | .11 | .077 | ↑ |
| 5/16 | .3125 | 4.62 | 3.19 | .3 | .047 | .022 | .17 | .115 | .08 | ↑ |
| 21/64 | .3281 | 4.75 | 3.31 | .316 | .05 | .023 | .18 | .121 | .085 | ↓ |
| 11/32 | .3438 | 4.87 | 3.44 | .331 | .053 | .024 | .19 | .127 | .089 | ↓ |
| 23/64 | .3594 | 5 | 3.5 | .347 | .054 | .024 | .2 | .133 | .093 | ↓ |
| 3/8 | .375 | 5 | 3.62 | .363 | .055 | .025 | .21 | .139 | .097 | ↓ |
| 25/64 | .3906 | 5 | 3.62 | .376 | .058 | .025 | .21 | .144 | .101 | ↓ |
| 13/32 | .406 | 5 | 3.62 | .393 | .061 | .026 | .22 | .15 | .105 | ↓ |
| 27/64 | .4219 | 5 | 3.62 | .409 | .064 | .026 | .23 | .156 | .109 | ↓ |
| 7/16 | .4375 | 5 | 3.62 | .425 | .067 | .027 | .24 | .162 | .113 | ↓ |
| 29/64 | .4531 | 5 | 3.62 | .44 | .07 | .027 | .25 | .168 | .117 | ↓ |
| 15/32 | .4688 | 5 | 3.62 | .445 | .073 | .028 | .26 | .173 | .121 | ↓ |
| 31/64 | .4894 | 5 | 3.62 | .476 | .074 | .029 | .27 | .179 | .125 | ↓ |
| 1/2 | .5 | 5 | 3.62 | .487 | .075 | .03 | .28 | .185 | .129 | 12' |

The radially inward back taper angle "BT" of pilot tip 38 is one and one-half degrees with a tolerance of plus or minus one-half degree. Referring to FIG. 9, the radial relief dimension "RR" at the trailing edges 64 and 68 of outer surfaces 58 and 60, respectively, is 0.0076 inch with a tolerance of plus or minus 0.0025 inch.

Referring again to FIG. 8 the point angle "FA" of major cutting lips 72 and 74 exceeds 180 degrees to provide the "fishtail" configuration. In the preferred embodiment, point angle "FA" is 190 degrees. Referring to FIG. 6, the lip relief angle "f" of the relief surfaces 76 and 78 for major cutting lips 72 and 74, respectively, is twelve degrees except for the 1/8 inch drill which has a lip relief angle "f" of fourteen degrees.

Referring to FIG. 1, drill bit 20 is formed with a comparatively shallow or low helix angle "HA." In the preferred embodiment, the helix angle "HA" for drill bit 20 is 22.5 degrees with a tolerance of plus or minus 1.5 degrees. The shallow or low helix angle permits drill bit 20 to be used in drilling wood as well as metal. Drill bits typically used for drilling in metal have higher helix angles. When metal-drilling drill bits are used for drilling wood, the higher helix angle causes the rotating bit to periodically enter an excessive self-feeding process whereafter the drill operator experiences a "jumping" sensation. With the low helix angle of drill bit 20, the operator experiences a smooth feed, particularly in wood, without excessive self feeding.

Further, when a drill bit breaks through the opposite side of a workpiece in the drilling of a hole, there is a tendency for the bit to begin to rapidly self-feed the bit through the drilled hole. This is particularly so for drill bits having high helix angles. With drill bit 20 having a low helix angle, the undesirable self-feeding of the bit at breakthrough is reduced significantly.

As noted above, the height or length "L" of the pilot tip 38 is illustrated in FIG. 8. Also, the length "L" of the pilot tip 38 for each of a variety of drill lengths is listed in the Table of Parameters. For example, the smallest drill listed in the Table is a 1/8 inch drill having a total drill length of 2.75 inches while the largest drill listed is a 1/2 inch drill having a total drill length of 5 inches. As shown in the Table, the length "L" of the pilot tip 38 of the 1/8 inch drill is 0.05 inch which is approximately 1.8 percent of the total length of the drill. As further shown in the Table, the length "L" of the pilot tip 38 of the 1/2 inch drill is 0.129 inch which is approximately 2.58 percent of the total length of the drill. An examination of each of the drill sizes in the Table of Parameters reveals that the pilot tip 38 is always less than 2.6 percent of the total length of the drill.

Figure 10:
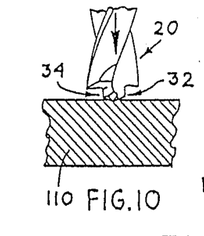
FIGS. 10 through 13 are partial side views showing the drill bit of FIG. 1 forming a hole in a workpiece.
Figure 11:
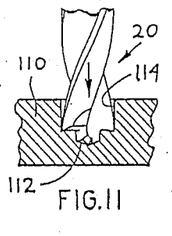

As shown in FIGS. 10 and 11, the split point end of pilot tip 38 is moved into a workpiece 110 to form a centering or secondary hole 112 which provides stabilization for bit 20 in the ultimate formation of the larger or primary hole 114 by cutting lips 72 and 74. Thus, pilot tip 38 has all of the advantages of a split point tip which enhances centering of the bit 20 and provides a means for chip formation and removal particularly when compared to a conventional chisel edge which tends initially to work the immediate area of the workpiece and form an extrudate of the workpiece material rather than form chips. Further, a chisel edge tends to "skip" or "run" laterally on the workpiece surface, particularly if there is no center-punched hole to guide a chisel-edge bit. Therefore, the split-point end of tip 38 provides significant initial centering and stabilizing of bit 20 in the drilling of hole 114.

Further, if the drive unit or drill for rotating drill bit 20 has a drill chuck which is out of round, the pilot tip 38 will wobble before the pilot tip engages the workpiece 110. It would appear that the wobble of drill bit 20 would be transmitted in the formation of the hole 114 which would also be out of round. However, as pilot tip 38 enters workpiece 110, the pilot tip immediately stabilizes working end 26 of drill bit 20 to provide a stabilized formation of holes 112 and 114.

Once pilot tip 38 becomes stabilized in workpiece 110, there is no wobble in working end 26 and in major cutting lips 72 and 74. With no wobble in major cutting lips 72 and 74, there is no transient edge loading experienced by the corners or points 96 and 88, respectively, of the cutting lips and, consequently, no breakage of the corners.

Since pilot tip 38 has stabilized drill bit 20, the pilot tip and the fishtail cutting section 32 will form a true round hole. Since there is no wobble in this area of drill bit 20, the corners of pilot tip 38 and fishtail section 32 travel through the shortest distance necessary in drilling holes 112 and 114, respectively. This increases the life of drill bit 20 when compared to a drill bit which is not stabilized wherein the points of such a drill bit must travel a greater distance to drill the same desired hole size which actually is drilled larger because of the out-of-round wobble effect.

Some drill bits are formed with an inward back taper on the lands and margins which begins at the working end of the bit and extends along the fluted section to the shank of the bit. Typically, drill bits have a back taper of 0.0008 inch per inch of drill bit length. This taper provides relief from any wobble which may be experienced along intermediate portions of the bit as the bit passes through the formed portions of the hole and which does not occur beyond the established back taper. In the preferred embodiment of drill bit 20, the inward back taper for the fluted section 28 is 0.001 inch per inch of drill bit length with a tolerance of plus or minus 0.0001 inch per inch. This further decreases any opportunity for wobble in an intermediate part of the drill bit 20 to engage and rub against the walls of the formed portions of hole 114. Effectively, then, lower power is required to move drill bit 20 through hole 114.

As illustrated in FIG. 3, a thickness "W" of a web 116 of drill bit 20 is located where the wall of one of the flutes 36 is closest to the wall of the other flute. Drill bits with thick webs require significant power to move the drill bit through a workpiece because of the required drill chisel length. In the preferred embodiment of drill bit 20, the web has been designed with a relatively thin web 116 at the tip or working end 26 of the bit. The thickness "W" of web 116 at the pilot of bit 20 is approximately fifteen percent of the major drill diameter with a tolerance of plus or minus 0.002 inch. For example, as indicated in the above table of parameters, the web thickness at the pilot of the 11/64 inch drill bit is 0.026 inch which is fifteen percent of the major drill diameter of 0.1719 inch. Also in the preferred embodiment of drill bit 20, web 116 increases in thickness from working end 26 toward the shank 30 by a radially outward back taper of 0.024 inch per inch of drill bit length with a tolerance of plus or minus 0.003 inch per inch. This taper permits web 116 to be thinner at the working end 26, thereby reducing the power requirement, while providing strengthening substance in trailing portions of drill bit 20.

Referring to FIG. 11, as drill bit 20 is moved into workpiece 110, outer points 96 and 88 (FIG. 4) of lips 72 and 74, respectively, are the first portions of "fishtail" cutting section 22 to engage the workpiece and the outer points begin to cut a circular scribe in the workpiece. Eventually cutting lips 72 and 74 cut and form chips from the workpiece material remaining between hole 112 formed by pilot tip 38 and the scribe formed by points 96 and 88 of the cutting lips. As drill bit 20 progresses through workpiece 110, the working end 26 of drill bit 20 remains stabilized by the self-centering capability of pilot tip 38. Further, points 98 and 88 of cutting lips 72 and 74, respectively, are always axially ahead of remaining portions of "fishtail" cutting section 32 and are, therefore, cutting and forming a smooth-walled hole rather than a rough-burred hole of the type typically formed by most conventional twist drills.

Also, due to the various relief clearances and minimum web thickness on pilot tip 38 and "fishtail" cutting section 32, continued drilling of holes 112 and 114 still requires only a low power. This is further enhanced by the inward back taper of margins 106 and lands 108 in the fluted section 28.

Figure 12:
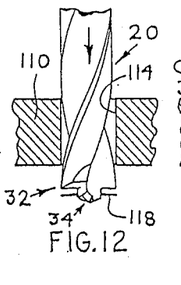

Because points 96 and 88 are leading the remainder of "fishtail" section 32, a trepanning disc 118 (FIG. 12) is cut from the last portion of material of the workpiece 110 in the formation of the hole. The trepanning effect results in the formation of a relatively burr-free opening at the bottom of hole 114 compared to the typically burred-hole openings formed by conventional twist drills having point angles of less than 180°. In addition, the low helix angle "HA" and the "fishtail" configuration of cutting section 32 preclude jamming and hang-up of drill bit 20 at the time when the bit "breaks through" workpiece 110 to form the lower opening of hole 114.

Figure 13:
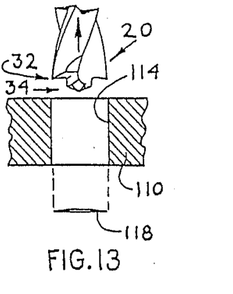

Since outer surfaces 58 and 60 of pilot tip 38 are formed with the radially inward back taper relief as indicated by angle "BT" (FIG. 8), and are formed with the radial relief represented by dimension "RR" (FIG. 9), forward edges 62 and 66 are the only portions of the pilot tip which tend to support trepanning disc 118 after the disc has been cut from workpiece 110. By virtue of the radii of fillets 92 and 100 and the above-noted relief, disc 118 readily separates from drill bit 20 as illustrated in FIG. 13 and is not carried with the drill bit as the bit is withdrawn through newly formed hole 114.

When using a conventional chisel edge drill, a relatively large thrust force is required in order to move the drill through a workpiece. This is due, in part, to a back force which has to be overcome when the relatively long cutting lips of the conventional chisel edge drill cut into the workpiece.

In comparison with the conventional chisel-edge drill, less thrust force is required when using drill bit 20 because, in part, the effective combined length of cutting lips 46, 48, 72 and 74 is less than the effective combined length of the cutting lips of the chisel-edge drill. Thus, relative less back force is developed by use of drill bit 20 and thereby requires relatively less thrust force to be applied by an operator. This is a clear advantage of drill bit 20 over the conventional chisel-edge drill.

In summary, drill bit 20 is designed to optimize use of a relatively low power, for example low hand bias, by an operator, to penetrate a workpiece comparatively faster than other drill bits. This minimizes the time that drill bit 20 is working in the drilling of a hole thereby increasing the comparative life of the bit. The life of drill bit 20 is also increased by the formation of thick continuous chips which carry away heat from the work area and by a pilot tip design which eliminates transient edge loading as noted above.

The various design features also result in no stall at breakthrough and provide for an essentially burr-free, true-round hole having superior hole-wall finish.

Thus, drill bit 20, as geometrically designed, is self-centering, requires low power, does not jam or form burrs at breakthrough, will not develop transient loading or wobble at working end 26 which avoids breaking of corners, does not stall while drilling, will penetrate the workpiece with ease, is less susceptible to breakage, will produce thicker chips for heat dispersal and full waste removal, will generate a balanced self-feeding capability to enhance the lower power characteristic, will develop a burr-free accurately-formed round hole and will provide comparatively longer drill life.

The above-described embodiment, of course, is not to be construed as limiting the breadth of the present invention. Modifications, and other alternative constructions, will be apparent which are within the spirit and scope of the invention as defined in the appended claims.

What is claimed is:

1. A self-centering drill bit, which comprises:
an elongated drill body having a shank end and a working end;
flutes formed in the drill body and extending to a free end of the drill body at the working end;
the working end of the drill body being formed with a major cutting section of a prescribed major drill diameter and including major cutting lips for cutting a primary hole in a workpiece;
a pilot tip formed on the working end of the drill body and extending from the major cutting section in a direction away from the shank end of the drill body;
the pilot tip of the drill body being formed with minor cutting lips of a minor drill diameter smaller than the major drill diameter for cutting a secondary hole in the workpiece;
the pilot tip being formed with at least one outer surface which extends from the major cutting section generally in an axial direction of the drill body;
the outer surface of the pilot tip having a forward edge contiguous with one flute and a trailing edge contiguous with another flute and wherein the outer surface is continuous and uninterrupted between the forward and trailing edges thereof;
the outer surface of the pilot tip raking radially inwardly from the forward edge to the trailing edge to form a radial relief clearance on the outer surface, and
the outer surface of the pilot tip being formed with an inward back tape extending toward the major cutting section in an axial direction to form an axial relief clearance on the outer surface.

2. The self-centering drill bit, as set forth in claim 1, wherein the outer surface rakes radially inward a distance in a range of about 0.0051 inch to about 0.0101 inch.

3. The self-centering drill bit as set forth in claim 1, wherein the outer surface is formed with the inward back taper in a range of about one degree to about two degrees.

4. The self-centering drill bit as set forth in claim 1, wherein the pilot tip has a prescribed length which is less than 2.6 percent of the total length of the drill bit.

5. A self-centering drill bit, which comprises:
an elongated drill body having a shank end and a working end;
opposed flutes formed helically in the drill body at a prescribed helix angle and extending to a free end of the drill body at the working end;
the working end of the drill body being formed with a major cutting section of a prescribed major drill diameter and including a pair of major cutting lips arranged in an inversely angled configuration for cutting a primary hole in a workpiece;
a pilot tip formed on the working end of the drill body which extends a prescribed length from the major cutting section in a direction away from the shank end of the drill body;
the pilot tip of the drill body formed with a prescribed minor drill diameter smaller than the prescribed major drill diameter;
the pilot tip of the drill body being formed with a pair of minor cutting lips for cutting a secondary hole in the workpiece;
the pilot tip being formed with two outer surfaces which extend from a juncture with the major cutting section generally in an axial direction;
each of the outer surfaces of the pilot tip raking radially inwardly to form a radial relief clearance on each of the outer surfaces;
each of the outer surfaces of the pilot tip being formed with an inward back taper extending toward the major cutting section in an axial direction to form an axial relief clearance on each of the outer surfaces, and
a fillet formed at the juncture of each of the two outer surfaces of the pilot tip and the major cutting section to provide a pair of fillets which rake radially inward to provide relief surfaces on the fillets.

6. A self-centering drill bit as set forth in claim 5, which further comprises the pilot tip being formed with cutting edges which precede engagement of the workpiece by the minor cutting lips to initiate drilling of the workpiece by the drill bit.

7. A self-centering drill bit as set forth in claim 5, which further comprises:
a forward edge contiguous with an associated one of the pair of major cutting lips formed on each of the pair of fillets;
a trailing edge formed on each of the pair of fillets;
each of the fillets being formed with a radius which decreases as the fillet extends from the forward edge to the trailing edge.

8. A self-centering drill bit as set forth in claim 5, wherein:
the helix angle is within a range of about twenty-one degrees to about twenty-four degrees;
the pair of major cutting lips being formed at a point angle greater than about 180 degrees;
the pair of minor cutting lips being formed at a point angle of about 135 degrees;
the prescribed length of the pilot is about seventy percent of the prescribed minor drill diameter;
the prescribed minor drill diameter is about thirty-seven percent of the prescribed major drill diameter; and
the inward back taper of the outer surfaces of the pilot tip formed at an angle in a range of about one degree to about two degrees.

9. The self-centering drill bit as set forth in claim 5, which further comprises:
a web formed between the flutes with a web thickness at the free end of the pilot tip being approximately fifteen percent of the major drill diameter with a tolerance of plus or minus 0.002 inch.

10. The self-centering drill bit as set forth in claim 9, which further comprises the web being formed with a radially outward taper beginning at the free end of the pilot tip and extending toward the shank end at a taper range of about 0.021 inch per inch of drill body length to about 0.027 inch per inch of drill body length.

11. The self-centering drill bit as set forth in claim 5, which fur her comprises the drill body formed with lip relief surfaces trailing the major cutting lips to provide a lip relief angle.

12. The self-centering drill bit as set forth in claim 11, wherein the lip relief angle is in a range of about twelve degrees to about fourteen degrees.

13. The self-centering drill bit as set forth in claim 5, which further comprises:
   a forward edge formed on each of the two outer surfaces adjacent an associated one of the pair of major cutting lips;
   a trailing edge formed on each of the two outer surfaces; and
   the radial relief clearance on each of the two outer surfaces raking radially inward from the forward edge to the trailing edge of the outer surface by a distance with a range of about 0.0051 inch to about 0.010 inch.

14. The self-centering drill bit as set forth in claim 5, wherein an exterior portion of the drill body is formed with an inward back taper from the major cutting lips toward the shank end which tapers at a rate within a range of about 0.0009 inch per inch of drill body length to about 0.0011 inch per inch of drill body length.

15. A self-centering drill bit, which comprises:
   an elongated drill body having a shank end and a working end;
   flutes formed in the drill body and extending to a free end of the drill body at the working end;
   the working end of the drill body being formed with a major cutting section of a prescribed major drill diameter and including major cutting lips for cutting a primary hole in a workpiece;
   a pilot tip formed on the working end of the drill body and extending from the major cutting section in a direction away from the shank end of the drill body;
   the pilot tip of the drill body being formed with minor cutting lips of a diameter smaller than the major drill diameter for cutting a secondary hole in the workpiece;
   the pilot tip being formed with at least one outer surface which is integrally joined at a juncture with the major cutting section; and
   a fillet formed at the juncture of the outer surface and the major cutting section and raking radially inward to provide a relief clearance on the fillet.

16. The self-centering drill bit as set forth in claim 15, which further comprises:
   a forward edge of the fillet which is contiguous with an associated one of the major cutting lips; and
   the fillet formed with a radius which decreases as the fillet extends away from the forward edge.

17. The self-centering drill as set forth in claim 15, wherein at least a portion of the major cutting lips are arranged in an inversely angled configuration.

18. A self-centering drill bit, which comprises:
   an elongated drill body having a shank end and a working end;
   flutes formed helically in the drill body at a prescribed helix angle of 22.5 degrees and extending to a free end of the drill body at the working end;
   the working end of the drill body being formed with a major cutting section of a prescribed major drill diameter and including a pair of major cutting lips formed at a point angle of 190° for cutting a primary hole in a workpiece;
   a lip relief surface formed on the major cutting section trailing each of the pair of major cutting lips;
   a pilot tip formed on the working end of the drill body with a minor drill diameter which is about thirty-seven percent of the prescribed major drill diameter;
   the pilot tip extends from the major cutting section in a direction away from the shank end of the drill body by a prescribed length which is about seventy-percent of the minor drill diameter;
   the pilot tip being formed with a pair of minor cutting lips at a point angle of 135° for cutting a secondary hole in the workpiece;
   the pilot tip formed with a pair of cutting edges contiguous with the minor cutting lips for initiating drilling of a hole in a workpiece by the drill bit;
   the pilot tip formed with at least one outer surface at a juncture with the major cutting section and having an axial relief clearance which is formed by an inward back taper extending toward the major cutting section in an axial direction at an angle of one and one-half degrees;
   the outer surface of the pilot tip raking radially inward to form a radial relief clearance, and
   a fillet formed at the juncture of the outer surface of the pilot tip and the major cutting section which rakes radially inward to provide a relief surface on the fillet.

19. The self-centering drill bit as set forth in claim 18, wherein the lip relief surface is formed at a lip relief angle in a range of about twelve degrees to about fourteen degrees.

20. The self-centering drill bit as set forth in claim 18, which further comprises:
   the outer surface of the pilot tip being formed with a forward edge adjacent an associated one of the major cutting lips;
   a trailing edge formed on the outer surface;
   the outer surface raking radially inward from the forward edge to the trailing edge by a distance of about 0.0076 inch;
   an exterior portion of the drill body being formed with a radially inward back taper from the major cutting lips toward the shank end at a taper rate of about 0.001 inch per inch of drill body length;
   a web formed between the flutes with a web thickness at the free end of the pilot tip being approximately fifteen percent of the major drill diameter; and
   the web being formed with a radially outward taper beginning at the free end of the pilot tip and extending toward the shank end at a taper rate of about 0.024 inch per inch of drill body length.

21. A unitary self-centering drill bit, which comprises:
   an elongated unitary drill body having an integrally formed shank end, intermediate section and working end formed in a stepped-drill-bit configuration;
   flutes formed in the drill body with each flute having a continuous uninterrupted surface extending from a juncture of the shank end and the intermediate section to a free end tip of the drill body at the working end and from side to side of each flute;
   the working end of the drill body being formed with a first section of a prescribed major drill diameter and including major cutting lips arranged in an inversely angled configuration for cutting a primary hole in a workpiece;
   the working end of the drill body being formed with a second section which is formed integrally with and extends from the first section in a direction away from the shank end of the drill body;

the second section of the drill body formed with a minor drill diameter smaller than the prescribed major drill diameter;

the second section of the drill body being formed with minor cutting lips for cutting a secondary hole in the workpiece preceding the cutting of the primary hole, and the free end tip being formed integrally with a chisel edge.

22. A unitary self-centering drill bit, which comprises:

an elongated drill body having a central axis and an integrally formed shank end, intermediate section and working end formed in a stepped-drill-bit configuration;

flutes formed in the drill body with each flute having a continuous uninterrupted surface extending from a juncture of the shank end of the intermediate section to a free end tip of the drill body at the working end;

the working end of the drill body being formed with a first section of a prescribed major drill diameter and including major cutting lips arranged in an inversely angled configuration for cutting a primary hole in a workpiece;

the working end of the drill body being formed with a second section which is formed integrally with and extends from the first section in a direction away from the shank end of the drill body;

the second section of the drill body formed with a minor drill diameter smaller than the prescribed major drill diameter;

the second section including a web having portions which extend radially outwardly in all directions from the central axis of the drill body;

the second section of the drill body being formed with minor cutting lips located on diagonally opposite sides of the web and spaced radially from the central axis of the drill body for cutting a secondary hole in the workpiece preceding the cutting of the primary hole;

the second section of the drill body being formed with cutting edges which are located on the web and extend generally radially inwardly from the minor cutting lips, and a chisel edge formed on the web and extending between inward ends of the cutting edges.

23. A unitary self-centering drill bit, which comprises:

an elongated drill body having a shank end, an intermediate section and a working end all formed integrally in the drill body;

flutes formed in the drill body with each flute having a continuous uninterrupted surface extending from a juncture of the shank end and the intermediate section to a free end tip of the drill body at the working end and from side to side of each flute;

the working end of the drill body being formed with a first section of a prescribed major drill diameter and including major cutting lips arranged in an inversely angled configuration for cutting a primary hole in a workpiece;

the working end of the drill body being formed with a second section which is formed integrally with an extends from the first section in a direction away from the shank end of the drill body;

the second section of the drill body formed with a minor drill diameter smaller than the prescribed major drill diameter;

the second section of the drill body being formed with a split point cutting tip including minor cutting lips for cutting a secondary hole in the workpiece preceding the cutting of the primary hole, and at least the first section and the second section of the working end of the drill body being formed in a single piece of material and in a stepped-drill-bit configuration.

24. A unitary self-centering drill bit, which comprises:

an elongated drill body having a shank end, an intermediate section and a working end all formed integrally in the drill body;

flutes formed in the body with each flute having a continuous uninterrupted surface extending from a juncture of the shank end and the intermediate section to a free end tip of the drill·body at the working end and from side to side of each flute;

the working end of the drill body being formed with a first section of a prescribed major drill diameter and including major cutting lips arranged in an inversely angled configuration for cutting a primary hole in a workpiece;

the working end of the drill body being formed with a second section which is formed integrally with and extends from the first section in a direction away from the shank end of the drill body;

the second section of the drill body formed with a minor drill diameter smaller than the prescribed major drill diameter;

the second section of the drill body being formed with minor cutting lips for cutting a secondary hole in the workpiece preceding the cutting of the primary hole;

the second section of the drill body being formed further with cutting edges which precede engagement of the workpiece by the minor cutting lips to initiate drilling of the workpiece by the drill bit, and at least the first section and the second section of the working end of the drill body being formed in a single piece of material and in a stepped-drill-bit configuration.

25. A unitary self-centering drill bit, which comprises:

an elongated drill body having a shank end, an intermediate section and a working end all formed integrally in the drill body;

flutes formed in the drill body with each flute having a continuous uninterrupted surface extending from a juncture of the shank end and the intermediate section to a free end tip of the drill body at the working end and from side to side of each flute;

the working end of the drill body being formed with a first section of a prescribed major drill diameter and including major cutting lips arranged in an inversely angled configuration for cutting a primary hole in a workpiece;

the working end of the drill body being formed with a second section which is formed integrally with and extends from the first section in a direction away from the shank end of the drill body;

the second section of the drill body formed with a minor drill diameter smaller than the prescribed major drill diameter;

the second section of the drill bit extending a prescribed length from the first section which is about seventy-percent of the prescribed minor drill diameter;

the second section of the drill body being formed with minor cutting lips for cutting a secondary hole in the workpiece preceding the cutting of the primary hole, and at least the first section and the second section of the working end of the drill body being formed in a single piece of material and in a stepped-drill-bit configuration.

26. A unitary self-centering drill bit, which comprises:

an elongated drill body having a shank end, an intermediate section and a working end all formed integrally in the drill body;

flutes formed in the drill body with each flute having a continuous uninterrupted surface extending from a juncture of the shank end and the intermediate section to a free end tip of the drill body at the working end and from side to side of each flute;

the working end of the drill body being formed with a first section of a prescribed major drill diameter and including cutting lips with at least portions thereof arranged in an inversely angled configuration;

the working end of the drill body being formed with a second section which is formed integrally with and extends from the first section in a direction away from the shank end of the drill body;

the second section of the drill body formed with a minor drill diameter smaller than the prescribed major drill diameter;

the second section of the drill body being formed with a split point cutting tip including minor cutting lips, and at least the first section and the second section of the working end of the drill body being formed in a single piece of material and in a stepped-drill-bit configuration.

* * * * *